Dec. 14, 1937.  C. R. KINKAID  2,102,538
ARMATURE UNIT
Filed Feb. 3, 1936

Charles R. Kinkaid,
INVENTOR
BY Victor J. Evans & Co.
ATTORNEYS

Patented Dec. 14, 1937

2,102,538

UNITED STATES PATENT OFFICE 2,102,538

ARMATURE UNIT

Charles Ray Kinkaid, Nashville, Tenn.

Application February 3, 1936, Serial No. 62,190

2 Claims. (Cl. 171—206)

This invention relates to armature units for electric generators, and has for the primary object the provision of a device of this character which will automatically cut in and out an auxiliary ground to a generator in accordance with the temperature to the latter to prevent damages to the generator or its armature caused by heating brought on by defects in the generator such as worn bearings, overcharged batteries, etc. or wherein the electrical output of the electric generator is choked or stopped from any cause.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a unit adapted to a commutator and armature shaft of an electric generator and constructed in accordance with my invention.

Figure 1:
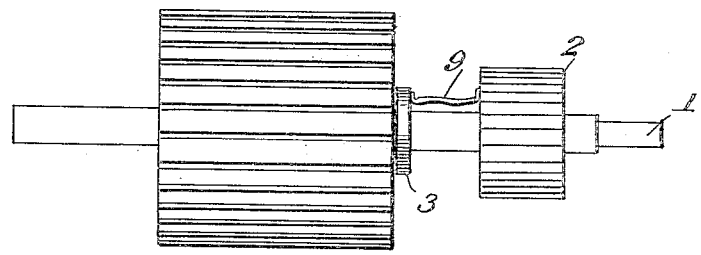
Figure 2:
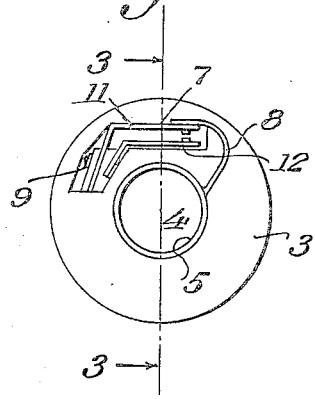
Figure 2 is a plan view illustrating the unit.
Figure 3:
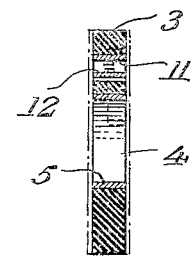
Figure 3 is a sectional view taken on the line 3—3 of Figure 2.
Figure 4:
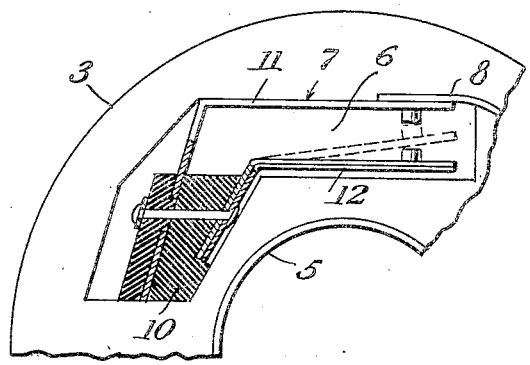
Figure 4 is an enlarged detail sectional view showing the circuit breaker of the unit.

Referring in detail to the drawing, the numeral 1 indicates an armature shaft of an electric motor having mounted thereto a commutator 2. These parts of a generator have my invention adapted thereto and which consists of a disc 3 constructed of insulating material and provided with a centrally arranged opening 4, the walls of which are engaged by a contact ring 5. The ring is secured to the disc 3 in any suitable manner and has a tight frictional contact with the armature shaft 1. A slot 6 is formed in the disc 3 in which is mounted a circuit breaker 7, one pole of which is connected to the contact ring 5 by a conductor strip 8 embedded in a groove or slot in the disc 3 and the other pole of said circuit breaker is connected to the commutator 2 by a conductor 9.

During normal operation of the generator to which my invention is adapted, the circuit breaker 7 occupies a circuit breaking position so that the circuit between the commutator 2 and the armature shaft is broken. However, should the temperature of the armature reach a predetermined degree or a temperature which will be detrimental to the generator, the circuit breaker closes and thereby provides an auxiliary ground to the generator.

The circuit breaker 7 consists of an insulated block 10 mounted in the slot 6 and carries contact arms 11 and 12. The contact arm 11 is in engagement with the contact strip 8 while the contact strip 12 is connected to the conductor 9. The contact strip 12 is movable by being constructed of bimetal affected by variances in temperature.

A generator equipped with this unit and employed for charging storage batteries or for any other electrical purpose will operate efficiently until the generator develops heat to a predetermined degree, which heat flexes the contact 12 into engagement with the contact 11, grounding the commutator of the generator. The heat referred to and which will become detrimental to the generator may be caused from defects in the generator such as worn bearings, arcing brushes or from defects in the electric circuit connected to the generator or an overcharged battery. As soon as a certain resistance is offered to the electrical output of the generator, the latter is caused to overheat and this overheating causes damage to insulation, windings and other parts and especially to the windings of the armature. A generator equipped with my invention will be prevented from overheating and consequently eliminates danger of injury from such causes.

The grounding of the armature windings of the generator causes an unloading process which takes place with each revolution of the armature. The unloading process is greater than the building characteristics of the generator, thus stopping the electrical output from the generator and permitting the latter to cool. The cooling of the generator continues until the temperature lowers sufficiently to eliminate danger of damage to the generator from overheating.

Having described the invention, I claim:

1. In combination with a generator armature having an armature shaft and a commutator, a self-contained thermostatically operated circuit breaker comprising an insulated disc having a slot and a centrally arranged opening, a contact ring mounted in said opening and frictionally engaging said armature shaft, an insulated block mounted in said slot, a fixed contact strip carried by said block and disposed within said slot, a bimetal contact strip fixed to said block and in said slot, means for electrically connecting said fixed contact strip to said contact ring, and means for electrically connecting said bimetal contact strip to said commutator.

2. A self-contained thermostatically operated device for preventing overheating of an electric generator having an armature shaft and a commutator comprising an insulated member carried by the generator, a contact member fixed to said insulated member and engaging the armature shaft, a fixed contact strip carried by said insulated member, a bimetal contact strip carried by said insulated member, means for electrically connecting one of said contact strips to said contact member, means for electrically connecting the other contact strip to the armature shaft.

CHARLES RAY KINKAID.